(12) United States Patent
Khasiev

(10) Patent No.: US 7,113,413 B1
(45) Date of Patent: Sep. 26, 2006

(54) CONTROL CIRCUIT WITH TRACKING TURN ON/OFF DELAY FOR A SINGLE-ENDED FORWARD CONVERTER WITH SYNCHRONOUS RECTIFICATION

(75) Inventor: Victor Khasiev, Livermore, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 44 days.

(21) Appl. No.: 10/844,167

(22) Filed: May 12, 2004

(51) Int. Cl.
*H02M 3/335* (2006.01)

(52) U.S. Cl. .................... 363/21.14; 363/89; 323/222

(58) Field of Classification Search .............. 363/17, 363/21.1–21.17, 80, 16–19, 25–26, 89, 97, 363/24; 323/222, 271, 235, 208
See application file for complete search history.

(56) References Cited

U.S. PATENT DOCUMENTS 5,402,329 A * 3/1995 Wittenbreder, Jr. .......... 363/16
5,757,627 A * 5/1998 Faulk ....................... 363/21.14
6,069,804 A * 5/2000 Ingman et al. ............ 363/21.14
6,545,883 B1 * 4/2003 Xing et al. ............... 363/21.11
6,671,189 B1 * 12/2003 Jansen et al. ............. 363/21.14
6,961,253 B1 * 11/2005 Cohen ......................... 363/89

\* cited by examiner

*Primary Examiner*—Rajniaknt B. Patel
(74) *Attorney, Agent, or Firm*—Sidley Austin LLP

(57) ABSTRACT

In a converter-controller the controller includes a primary power device coupled to a primary coil and a resonant reset capacitor in parallel with the primary power device. The controller can switch the primary power device with a variable frequency. The resonant capacitor and the primary coil have a primary resonant cycle. The controller can turn on/off the primary power device for half of the primary resonant cycle. The controller includes a first secondary power device, having a first voltage and a second secondary power device, having a second voltage, each voltages having a rising threshold-point and a falling threshold-point. The first and second secondary power devices are coupled to the control logic and to corresponding terminals of the secondary coil. The controller can synchronize the rising threshold-point of the first voltage with the falling threshold-point of the second voltage or vice versa.

26 Claims, 9 Drawing Sheets

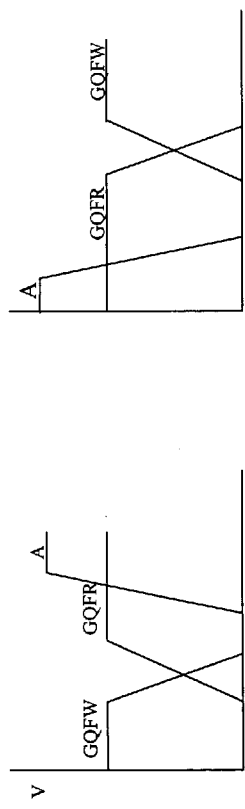
FIG. 8
FIG. 9
FIG. 10
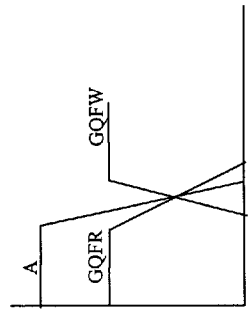
FIG. 11
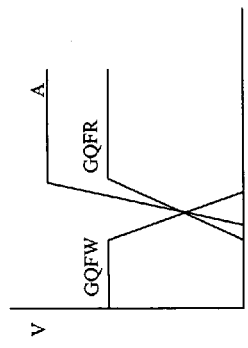
FIG. 12
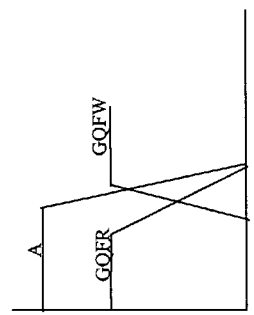
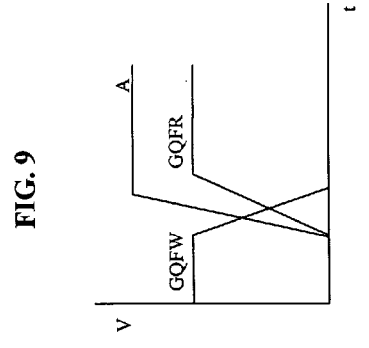
FIG. 13

CONTROL CIRCUIT WITH TRACKING TURN ON/OFF DELAY FOR A SINGLE-ENDED FORWARD CONVERTER WITH SYNCHRONOUS RECTIFICATION

BACKGROUND

1. Field of Invention

The present invention relates to forward converters and more particularly to forward DC/DC converters with adjustable resets.

2. Description of Related Art

FIG. 1 illustrates an existing forward converter design with resonant reset. Converters typically have a primary and a secondary circuit. The primary circuit includes a MOSFET QPR, having a resonant reset capacitor Cr, where MOSFET QPR is coupled to a terminal of the primary coil of Power Transformer T1. The other terminal of the primary coil is driven by a DC voltage source Vin. The secondary circuit includes MOSFETs QFR and QFW, and inductor L1.

A function of MOSFET QPR is to control the energy transfer from DC source Vin to load R_L. In the secondary circuit MOSFETs QFR and QFW constitute a control driven synchronous rectification stage. Here the term "control driven" indicates a forced commutation of MOSFETs QFR and QFW, based on the signals generated by the control circuit of the converter. The control circuit includes Control Block U1, controlling the gates of MOSFETs QPR, QFR, and QFW through corresponding gate drivers U2, U3, and U4, respectively. The MOSFETs QPR, QFR, and QFW contain, as a byproduct of the manufacturing process, a parasitic rectifier, or body diode, which can be thought of as a diode connected across the MOSFET channel, as shown explicitly in FIG. 1.

FIG. 2 illustrates the timing diagrams of the forward converter of FIG. 1. The forward converter exhibits resonant reset and synchronous rectification and operates as follows. When MOSFET QPR is ON, energy transfers from the primary side of Power Transformer T1 to the secondary side. In the timing diagram G_QPR, G_QFR and G_QFW are the gate voltages of MOSFETs QPR, QFR, and QFW, respectively. V_A, V_B, and V_C indicate voltages at points, or terminals, A, B, and C, respectively.

When MOSFET QPR is ON, MOSFET QFR is also ON and MOSFET QFW is OFF. In FIG. 2 this is indicated by G_QPR and G_QFR being "High" and G_QFW being "Low". When MOSFET QPR is ON, voltages V_B and V_C are essentially zero.

When MOSFET QPR turns OFF, V_C increases very fast, until resonant capacitor Cr charges to a voltage essentially equal to Vin. Once Cr charged to the Vin level, the time dependence of V_C is determined by the resonant dynamics of the LC circuit formed by the primary coil with inductance Lpr and resonant capacitor Cr. V_C increases and decreases in a resonant manner as shown by the timing diagram in FIG. 2.

V_C cannot drop below Vin while MOSFET QPR is OFF. Therefore, when during the resonant cycle V_C drops back to the Vin value, it stays level until the beginning of a new cycle. The time interval, when V_C remains constant is denoted by $t_{DT}$ and is referred to as Dwell Time, as indicated in FIG. 2.

The magnetizing current Im, which flows through the primary coil of Power Transformer T1, increases during the time when MOSFET QPR is ON, governed by:

$$Im = \frac{V_{IN} * t_{ON}}{L_{PR}}$$

where $L_{PR}$ is the inductance of the primary coil of Power Transformer T1 and $t_{ON}$ is the time, when MOSFET QPR is ON.

The value of magnetizing current Im, decreases and reaches zero when V_C reaches its peak. Im continues to decrease to negative values until V_C drops back to the Vin level after half of the resonant cycle passed. After this moment, V_C stays at the Vin level for the $t_{DT}$ interval. Accordingly, Im does not change either in the $t_{DT}$ interval. In this interval Im is negative and flows through the parasitic rectifier of MOSFET QFR. At this time V_C can not drop below Vin level, because the body diode of MOSFET QFR (that is OFF at this time) is forward biased, essentially clamping V_C to the Vin level.

When MOSFET QPR is ON, the secondary-side current through the load is denoted by I_L, which is then reflected back to the primary side as I_LR:

$$I\_LR = \frac{I\_L}{N}$$

The total current through the primary coil is the sum of the magnetizing current Im and the reflected current I_LR:

I_QPR=Im+I_LR as shown in FIG. 2.

In an analogous manner, the Im magnetizing current of the primary circuit generates an Im_R reflected magnetizing current in the secondary circuit:

Im_R=Im*N

The total current in the secondary circuit is the sum of the reflected magnetizing current Im_R and the load current I_L.

Losses, which occur during the Dwell Time $t_{DT}$, decrease the efficiency of the converter. The Dwell Time loss $P_{DT}$ is:

$$PDT = \frac{Vfd * Im\_R * t_{DT}}{T}$$

where T is a switching period and $V_{fd}$ is the forward voltage drop across the parasitic diodes of MOSFET QFR. A typical value for $V_{fd}$ is in the range of about 0.5V to about 1V, depending on the type of MOSFETs. In some MOSFETs $V_{fd}$ is about 0.7 V.

Losses during the Dwell Time are often so large that they significantly reduce the overall efficiency of the converter.

A method to reduce Dwell Time losses was described in: "*The Implication of Synchronous Rectifiers to the Design of Isolated, Single-Ended Forward Converters*", by Christopher Bridge, (Unitrode Products from Texas Instruments, Power Supply Design Seminar, 2001).

FIG. 3 illustrates a block-diagram of the suggested system. In this system MOSFETs QFR and QFW are turned ON and OFF with some delay. These delays are adjusted based on the various MOSFET voltages as described below.

FIG. 4 illustrates the timing diagram of the system of FIG. 3. Quantities are labeled analogously as in FIG. 2. The timing traces of several quantities in FIG. 4 are very similar to those of FIG. 2.

A difference from FIG. 2 is that MOSFET QFR is turned ON at the beginning of the Dwell Time. Therefore, during Dwell Time both MOSFETs QFR and QFW are ON. When MOSFET QPR turns ON, MOSFET QFR stays ON. When MOSFET QPR turns OFF, MOSFET QFR turns OFF and MOSFET QFW turns ON and the cycle repeats.

This system has an improved efficiency because the reflected load current during the Dwell Time does not flow through the parasitic diode of MOSFET QFR, but through its main channel, as QFR is turned ON. Since the resistance of the main channel is negligible compared to that of the parasitic diode, the losses during Dwell Time are reduced considerably.

FIGS. 5 A–B illustrate an additional aspect of these converters. The term "commuting" is used to describe the sequence of switching of various MOSFET voltages. In a MOSFET it takes a finite time to fully reach a new voltage after the switching started. This is why the voltages in FIGS. 5A–B rise and fall with a finite slope.

FIG. 5A illustrates a non-optimal commutation of voltages in MOSFET QFW. V_A, the voltage at terminal A, drops towards zero, when MOSFET QPR turns OFF. Essentially simultaneously, the polarity across inductor L1 changes because inductor L1 tries to maintain its current. This causes V_A to drop past zero to negative values. However, because MOSFET QFW is OFF, V_A drops negative not more than one diode voltage drop, because the body diode of MOSFET QFW is forward biased. Voltage Vds across MOSFET QFW drops to zero and goes negative in a way analogous to V_A.

After a time interval D the gate voltage Vgs of MOSFET QFW rises, eventually turning ON. During the intermediate time interval D the current is forced to flow through the parasitic diode of the MOSFET, leading to high dissipative losses.

FIG. 5B illustrates an optimized commutation of MOSFET QFW. Here Vgs rises before Vds drops to zero. Therefore, MOSFET QFW is turned ON before Vds drops to zero, and the current is not forced through the parasitic diode. Therefore, this commutation avoids the high dissipation.

Returning to FIG. 3, it is illustrated that the suggested system employs a Control Block U1 to control the turning of MOSFETs QFR and QFW trough adjustable Turn ON/OFF Delay circuits. Control Block U1 functions in accordance with the voltage levels of the MOSFETs. Control Block U1 optimizes the commutation timing of the MOSFETs QFR and QFW as described in relation to FIG. 5B, reducing converter switching losses. Other related circuits were suggested in U.S. Pat. Nos. 6,001,703, 6,026,005, and 6,188, 592, incorporated herein in their entirety by reference.

SUMMARY

Briefly and generally, embodiments of the invention include a controller for a converter, the converter having a transformer, which contains a primary coil in a primary circuit and a secondary coil in a secondary circuit. The controller includes a primary power device coupled to the primary coil and a resonant reset capacitor coupled in parallel with the primary power device, where the resonant capacitor and the primary coil have a primary resonant cycle. The controller further includes one or more secondary power device in the secondary circuit, and a control logic, coupled to the primary power device and to at least one of the secondary power devices. The control logic is capable of turning the primary power device on and off for a time, which is essentially equal half of the primary resonant cycle.

In some embodiments the controller is capable of turning on and turning off the primary power device with a variable frequency. In embodiments the primary resonant cycle of the primary circuit is essentially determined by a capacitance of the resonant reset capacitor and an inductance of the primary coil. In these embodiments the variable frequency is essentially determined by the primary resonant cycle.

In embodiments the controller includes a first secondary power device, coupled to a first terminal of the secondary coil and having a first voltage with a rising threshold-point and a falling threshold-point, and a second secondary power device, coupled to a second terminal of the secondary coil and having a second voltage with a rising threshold-point and a falling threshold-point. The first and second secondary power devices are coupled to the control logic. The control logic is operable to synchronize one of the rising threshold-point of the first voltage with the falling threshold-point of the second voltage and the falling threshold-point of the first voltage with the rising threshold-point of the second voltage.

In embodiments the first terminal of the secondary coil has a terminal voltage, which has a terminal rising and a terminal falling edge. In these embodiments the control logic is capable of synchronizing one of the terminal rising edge with the falling threshold-point of the first secondary power device, and the terminal falling edge with the rising threshold-point of the first secondary power device.

BRIEF DESCRIPTION OF DRAWINGS

For a more complete understanding of the present invention and for further features and advantages, reference is now made to the following description taken in conjunction with the accompanying drawings.

FIG. 8 is a timing diagram illustrating the terminal rising edge of V_A being ahead of the threshold-point of the gate voltages GQFW and GQFR according to embodiments of the invention.

FIG. 9 is a timing diagram illustrating the terminal rising edge of V_A being synchronized with the threshold-point of the gate voltages GQFW and GQFR according to embodiments of the invention.

FIG. 10 is a timing diagram illustrating the terminal rising edge of V_A being behind the threshold-point of the gate voltages GQFW and GQFR according to embodiments of the invention.

FIG. 11 is a timing diagram illustrating the terminal falling edge of V_A being ahead of the threshold-point of the gate voltages GQFW and GQFR according to embodiments of the invention.

FIG. 12 is a timing diagram illustrating the terminal falling edge of V_A being synchronized with the threshold-point of the gate voltages GQFW and GQFR according to embodiments of the invention.

FIG. 13 is a timing diagram illustrating the terminal falling edge of V_A being behind the threshold-point of the gate voltages GQFW and GQFR according to embodiments of the invention.

DETAILED DESCRIPTION

Embodiments of the present invention and their advantages are best understood by referring to FIGS. 6–14 of the drawings. Like numerals are used for like and corresponding parts of the various drawings.

Figure 6:
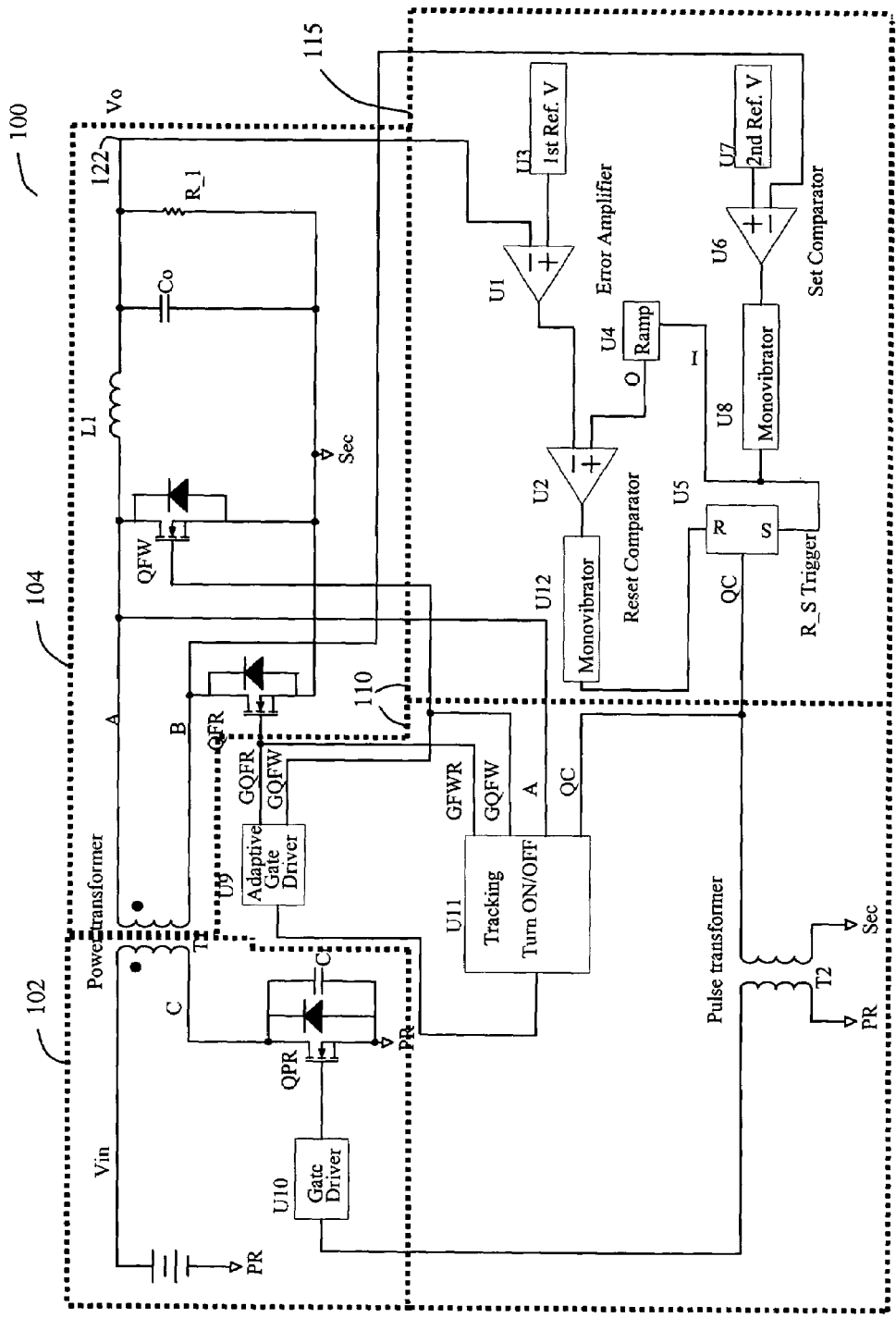
FIG. 6 illustrates a converter and its controller according to embodiments of the invention.

FIG. 6 illustrates a block diagram of a forward converter 100 with a controller 110 according to embodiments of the invention. The topology of converter 100 includes a primary circuit 102 and a secondary circuit 104. In primary circuit 102 a primary power device QPR controls the flow of current and through that the energy transfer from the input of primary circuit 102 to the output of secondary circuit 104. Primary power device QPR in the illustrated converter is a MOSFET. In other embodiments primary power device QPR can be a bipolar junction transistor or other equivalents. The MOSFETs or transistors can be n-based or p-based semiconductor structures. MOSFET QPR is coupled in parallel to resonant reset capacitor Cr. In some embodiments resonant reset capacitor is an explicit capacitor, in other embodiments it can have a parasitic component. MOSFET QPR further includes a body diode, often formed as a parasitic diode during manufacture. The gate of MOSFET QPR is controlled by gate driver U10. The source of MOSFET QPR is grounded. The drain is coupled to terminal C of the primary coil of Power Transformer T1. The voltage of terminal C is denoted by V_C. The other terminal of the primary coil is coupled to a voltage source, receiving a voltage Vin. This voltage source can be a DC source or a rectified AC source. The black dots indicate the polarity, or sense, of the windings of the primary coil and the secondary coil of Power Transformer T1. The windings, as shown, correspond to a forward converter topology. Other embodiments of the invention are realized in flyback and other types of converters, with obvious modifications.

Converter 100 further includes secondary circuit 104. Secondary circuit 104 includes secondary power devices QFR and QFW. In the illustrated embodiments secondary power devices QFR and QFW are MOSFETs, but in other embodiments they can be bipolar transistors and other equivalents. Secondary power device QFW is coupled between terminal A of the secondary coil of Power Transformer T1 and a ground. The voltage of terminal A is denoted by V_A. Secondary power device QFR is coupled between terminal B of the secondary coil of Power Transformer T1 and a ground. The voltage of terminal B is denoted by V_B.

Secondary circuit 104 further includes inductor L1, coupled to output capacitor Co at output voltage terminal 122. Converter 100 is outputting an output voltage Vo at output voltage terminal 122. Output voltage Vo is typically coupled into a load R_L, which is coupled in parallel to output capacitor Co.

Controller 110 includes an Adaptive Gate Driver U9, a Tracking Turn ON/OFF circuit U11 and a logic circuit 115. Adaptive Gate Driver U9 is coupled to the gates of MOSFETs QFR and QFW, and controls the ON and OFF states of the secondary power devices QFR and QFW. The output of Tracking Turn ON/OFF circuit U11 is coupled to Adaptive Gate Driver U9. Tracking Turn ON/OFF circuit U11 receives signals through its coupling to the gates of secondary power devices QFW and QFR, to terminal A, and to the output of Logic Circuit 115.

Logic Circuit 115 includes Error Amplifier U1. Output voltage terminal 122 is coupled into the inverting input of Error Amplifier U1 and First Reference Voltage Source U3 is coupled into the non-inverting input of Error Amplifier U1. The output of Error Amplifier U1 is coupled into the inverting input of Reset Comparator U2. Ramp Generator U4 is coupled into the non-inverting input of Reset Comparator U2. The output of Reset Comparator U2 is coupled into Mono-vibrator U12. The output of Mono-vibrator U12 is coupled into the Reset input of RS Trigger U5.

Terminal B of the secondary coil of Power Transformer T1 is coupled into the inverting input of Set Comparator U6. Second Reference Voltage Source U7 is coupled into the non-inverting input of Set Comparator U6. The output of Set Comparator U6 is coupled into Mono-vibrator U8. The output of Mono-vibrator U8 is coupled into the input of Ramp Generator U4 and into the set input of RS trigger U5. The output of RS trigger U5 is coupled into an input of Tracking Turn ON/OFF circuit U11 and into gate driver U10 through a pulse transformer T2.

The operation of converter 100 and converter controller 110 will be described in relation to FIGS. 6 and 7.

Figure 7:
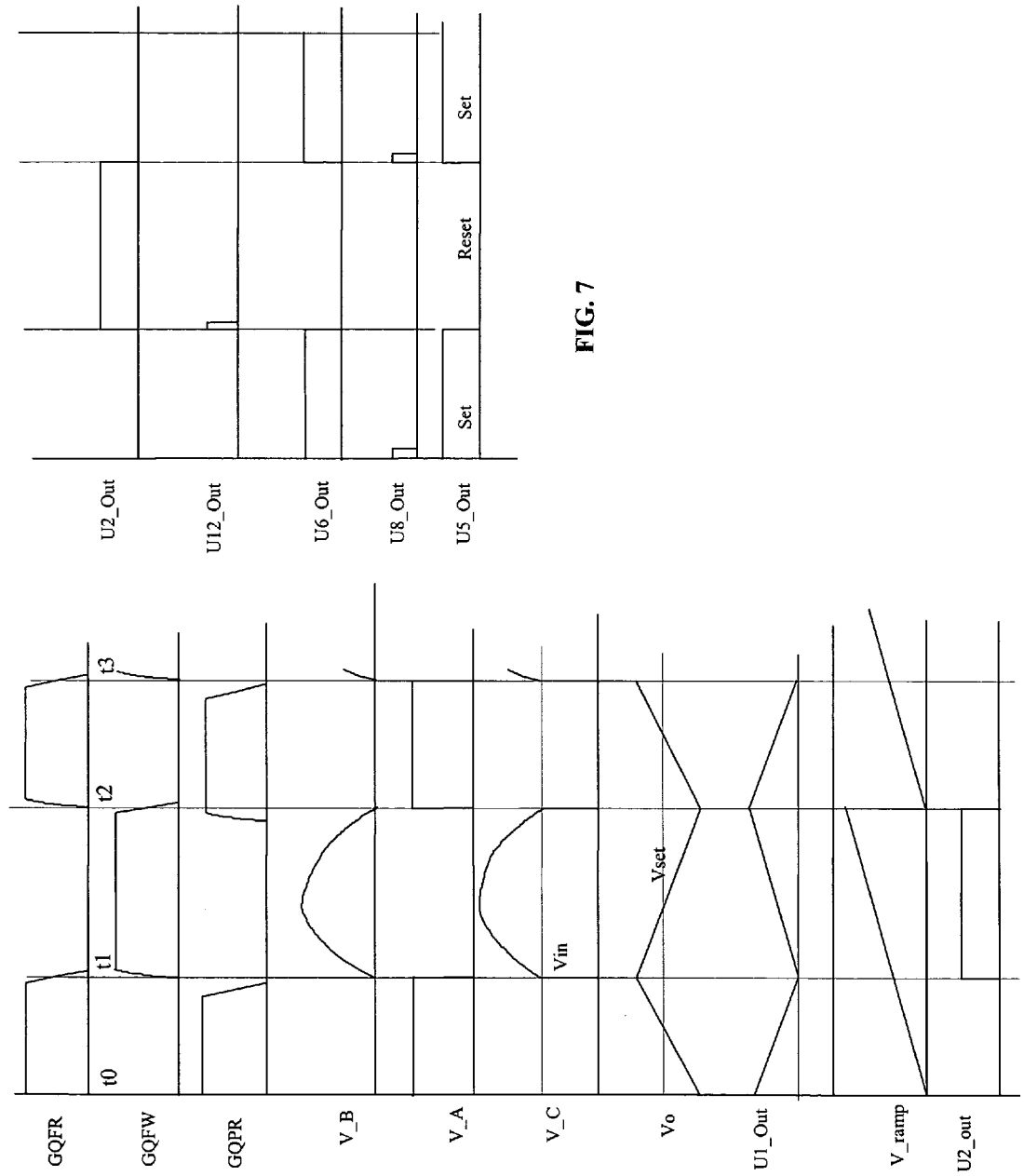
FIG. 7 is the timing diagram of the converter and its controller of FIG. 6.

FIG. 7 illustrates the timing diagrams of the voltages of converter 100 and controller 110. The cycles start at time instances t0 and again at t2. The details of the beginning of cycles are more clearly visible around time instance t2, where the cycle restarts. As was explained earlier, resonant capacitor Cr and the inductance of the primary coil form a resonant circuit. This resonant circuit induces voltage V_C of terminal C to follow a resonant cycle. As can be seen in FIG. 7, just before the beginning of the cycle at t2, V_C is finishing a resonant cycle, following its descending branch. In existing converters, when V_C hits Vin, the initial value of the resonant cycle, V_C would remain constant for the duration of the Dwell Time.

Embodiments of the present invention essentially eliminate the Dwell Time. The equation describing $P_{DT}$, the losses in the converter, shows that $P_{DT}$ is essentially proportional to $t_{DT}$, the length of the Dwell Time. Therefore, eliminating the Dwell Time essentially eliminates the corresponding losses PDT and thus improves the efficiency of converter 100. Embodiments of the present invention operate by the following scheme. As can be seen in FIG. 7, V_B, the voltage at terminal B, is tracking V_C up to a constant in the interval preceding t2. This constant is such that V_B is approaching zero, when V_C approaches Vin. Therefore, the voltage of Reference Voltage Source U7 can be adjusted so that V_B falls below the voltage of Reference Voltage Source U7 essentially when V_C drops to Vin. These two, essentially simultaneous events start the cycle anew at t0 and again at t2, eliminating the Dwell Time.

Just before this t0 (t2) time instance MOSFET QFR is OFF, MOSFET QFW is ON, and MOSFET QPR is OFF. This can be seen more clearly in FIG. 7 just before t2 from their corresponding gate voltages, G_QFR, G_QFW, and G_QPR, respectively.

FIG. 7 shows that at t0 (t2) Set Comparator U6 turns from "Low" to "High" because V_B dropped below the voltage of Reference Voltage Source U7. Prompted by this, Mono-vibrator U8 generates a short pulse that sets RS trigger U5, turning its output from "Low" to "High". The short pulse generated by Mono-vibrator U8 also resets Ramp Generator U4, thus setting ramp voltage V_ramp to a zero value.

The state of RS trigger U5 controls the states of the primary and secondary power devices. In primary circuit 102 MOSFET QPR receives a "turn ON" control signal from RS trigger U5 trough Pulse Transformer T2 and Gate driver U10.

MOSFET QPR does not turn ON immediately after RS trigger U5 is set at about t0 (t2). The turning ON of MOSFET QPR is delayed by the leakage inductance of Pulse Transformer T2 and by the RC time-constants of parasitic resistors and capacitors. Once MOSFET QPR turns ON, the energy transfer starts from primary circuit 102 to secondary circuit 104.

In secondary circuit 104 Tracking Turn ON/OFF circuit U11 receives a control signal from RS Trigger U5 at time instance t0 (t2). In response, Tracking Turn ON/OFF circuit U11 sends a control signal to Adaptive Gate Driver U9 to turn MOSFET QFR ON and MOSFET QFW OFF.

Figure 1:
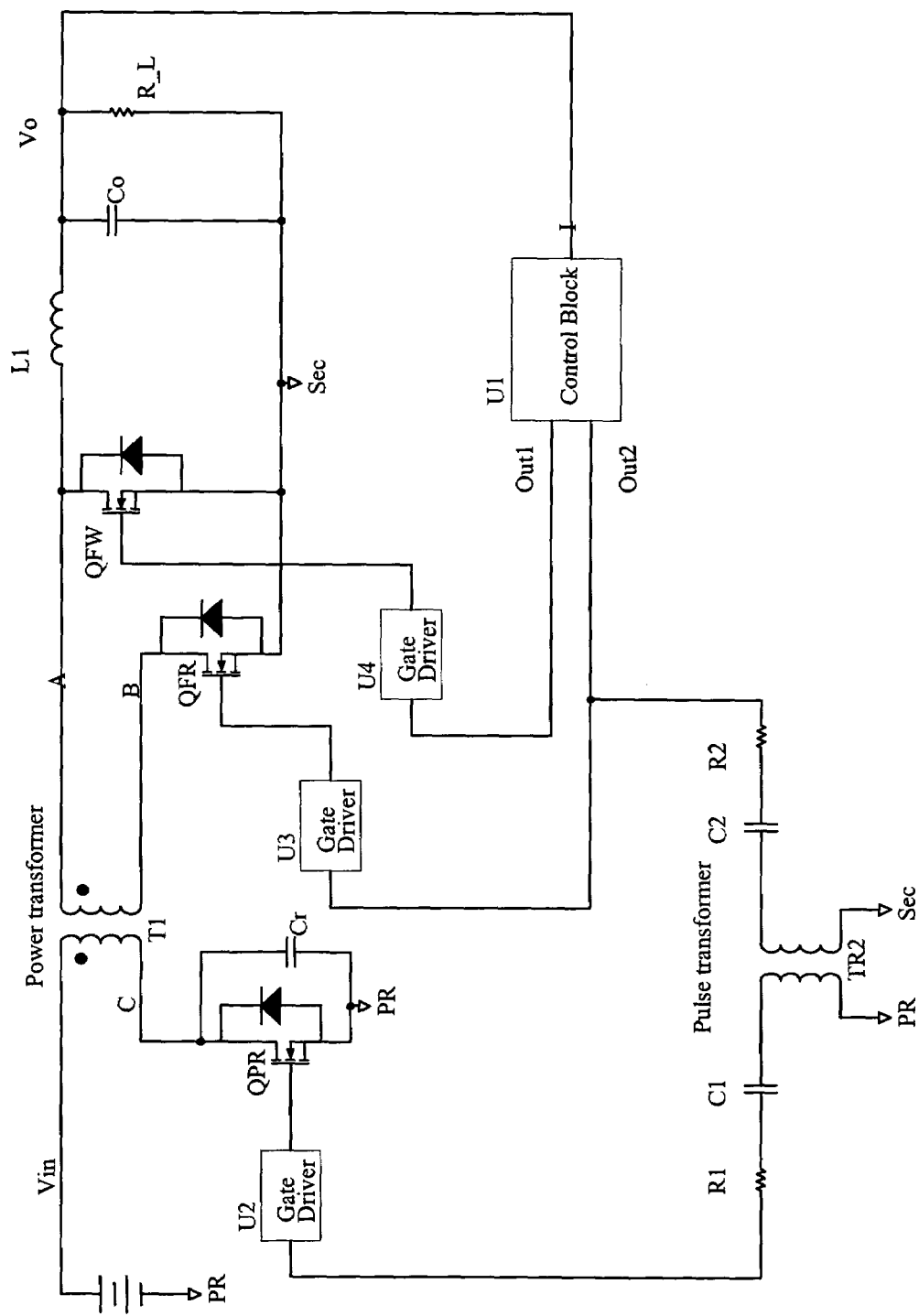
FIG. 1 is a block diagram of a converter.
Figure 2:
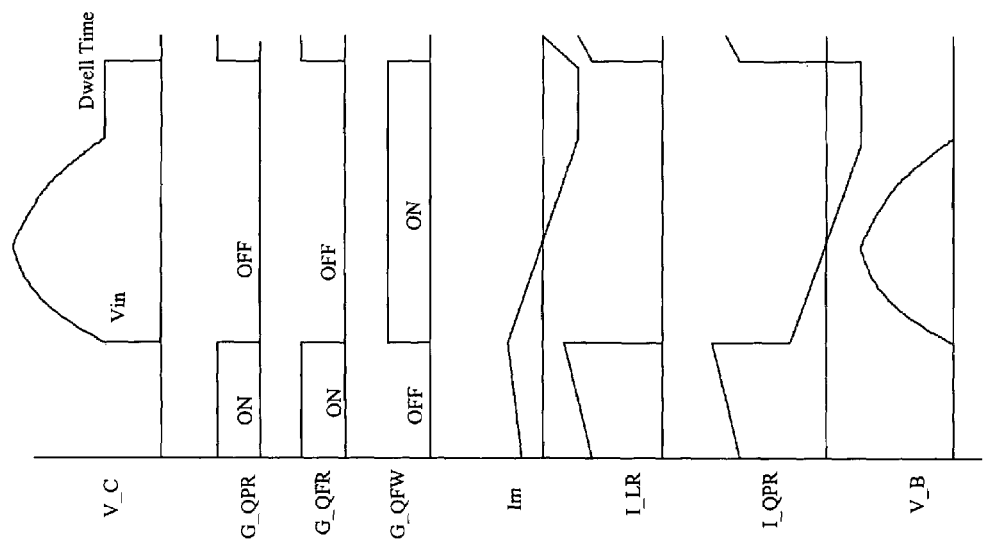
FIG. 2 is the timing diagram of the converter of FIG. 1.
Figure 3:
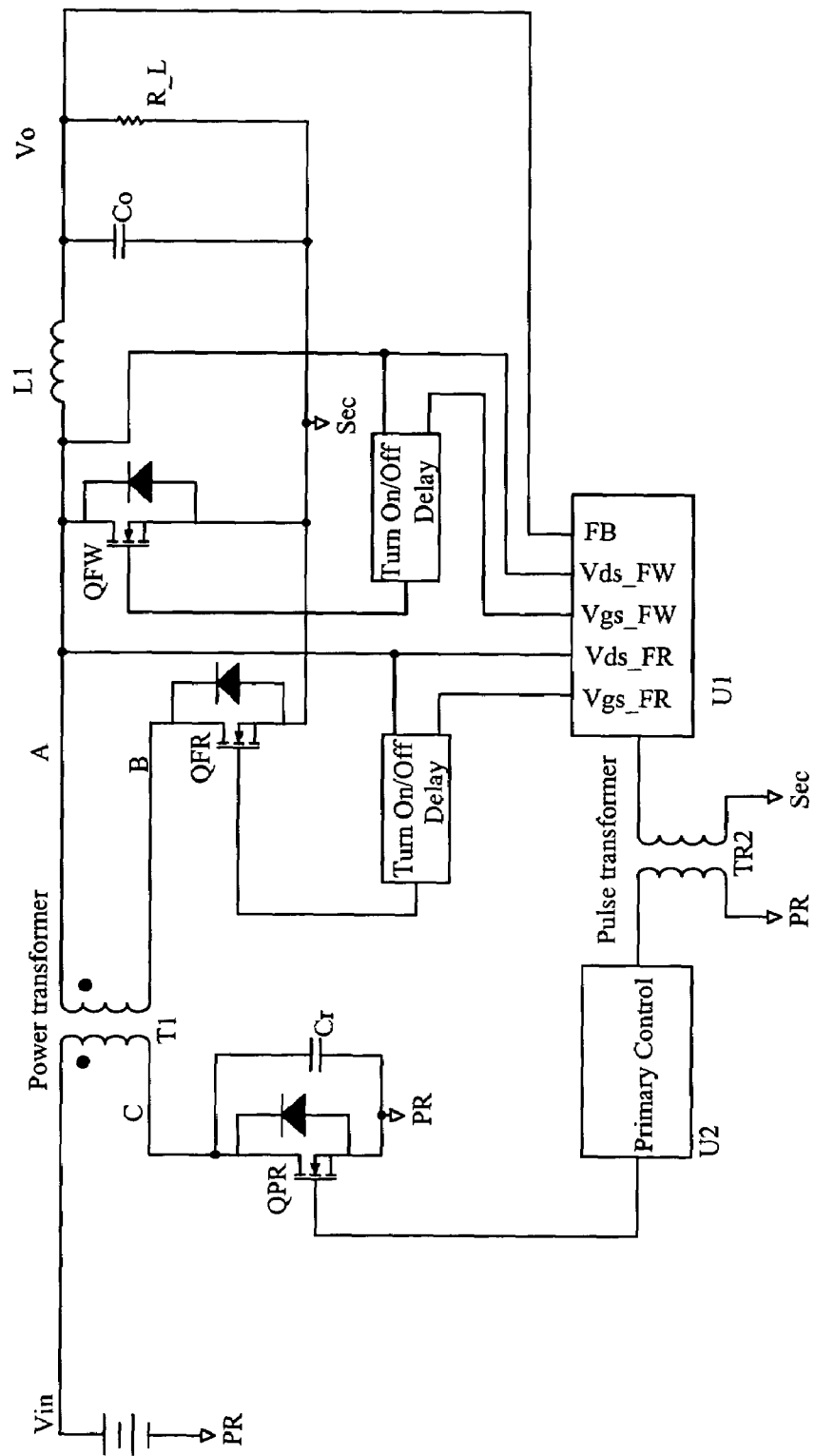
FIG. 3 is a block diagram of a converter.
Figure 4:
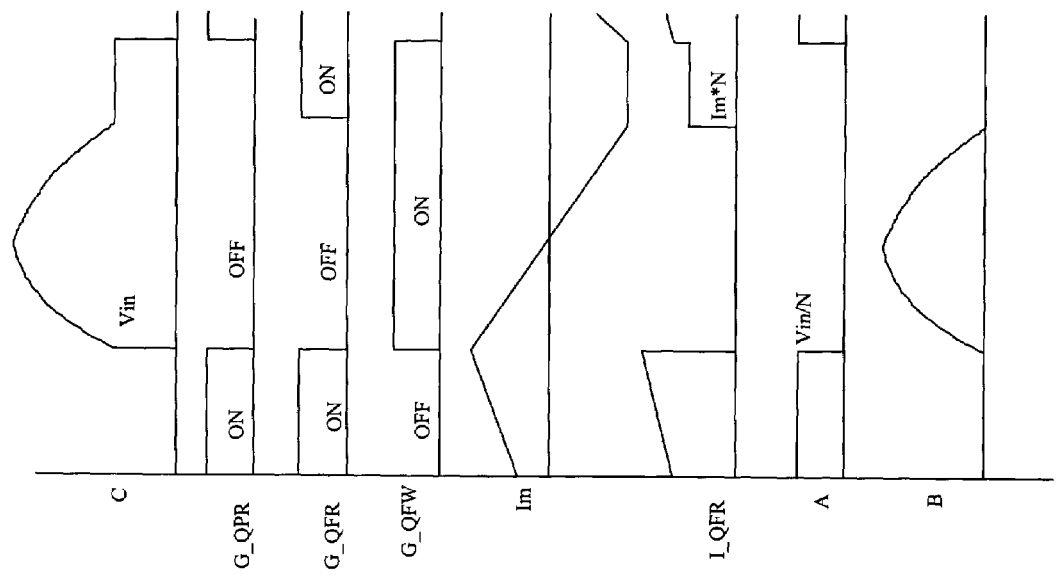
FIG. 4 is the timing diagram of the converter of FIG. 3.
Figure 5A:
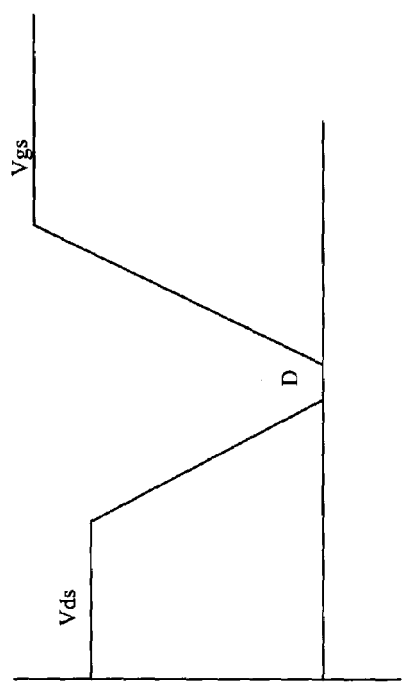
FIGS. 5 A–B are timing diagrams for the drain-source and gate voltages of a MOSFET in the converter of FIG. 3.
Figure 5B:
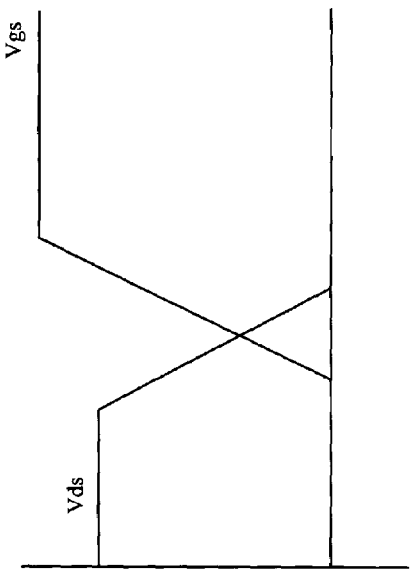

Adaptive Gate Driver U9 starts to turn OFF MOSFET QFW by sharply driving down gate voltage G_QFW and monitoring the time evolution of G_QFW. Adaptive Gate Driver U9 waits until G_QFW drops to a threshold level. Once G_QFW drops to the threshold level, Adaptive Gate Driver U9 starts to turn ON MOSFET QFR by increasing its gate voltage G_QFR. This timing protocol provides favorable commutation of gate voltages G_QFW and G_QFR, as described in relation to FIGS. 5A–B, thus reducing losses in secondary circuit 104. Other embodiments employ different conditions for turning ON and OFF secondary power devices QFW and QFR, based on fractional voltage values or explicit voltage levels.

FIG. 9 illustrates an efficient timing diagram, in accordance with the description of the operation of Adaptive Gate Driver U9. FIG. 9 illustrates the switching interval around t0 (t2) in more detail. During this switching interval MOSFET QFW turns OFF and MOSFET QFR turns ON. In this timing diagram gate voltage G_QFW drops to a threshold fraction of its value at a first threshold-point. Gate voltage G_QFR rises to essentially the same threshold fraction of its value at a second threshold-point. Adaptive Gate Driver U9 synchronizes the timing of secondary power devices so that the falling threshold-point of G_QFW essentially coincides with the rising threshold-point of G_QFR. As explained above, this timing makes the commutation of MOSFETs QFW and QFR efficient and minimizes losses in secondary circuit 104. In some embodiments, the gate voltages rise and fall not to threshold fractions, but to predetermined threshold levels.

FIG. 9 also illustrates that V_A, the voltage of terminal A, rises to a threshold value at a terminal threshold-point. This will be referred to as the terminal rising edge of V_A. In the illustrated embodiment, Tracking Turn ON/OFF circuit U11 synchronizes the terminal rising edge of V_A to essentially coincide with the threshold-points of gate voltages G_QFW and G_QFR, which are already synchronized by Adaptive Gate Driver U9. This timing makes the operation of converter 100 efficient, because the parasitic diodes of secondary power devices QFW and QPR are reverse biased during the switching interval and thus do not conduct. Therefore, the energy dissipation is reduced.

FIG. 8 and FIG. 10 illustrate timing diagrams, when terminal voltage V_A is turned ON before or after the shared threshold-points of gate voltages G_QFR and G_QFW, respectively. Equivalently, the terminal rising edge of V_A is ahead or behind the shared threshold-points of gate voltages G_QFR and G_QFW. In such timing schemes the load current and the reflected magnetizing current flow in part through the parasitic diodes of either QFW or QFR, generating dissipation and thus increasing losses. In some embodiments, at the beginning of the operation of converter 100 the timing diagram corresponds to FIG. 8. As the operation continues, Tracking Turn ON/OFF circuit U11 adjusts the timing diagram to correspond to that of FIG. 9.

Returning to FIG. 7 and further describing the beginning of the cycle at t0 (t2), output voltage Vo is below a predetermined, or preset (average) value Vset, because previously output capacitor Co discharged through load resistor R_L. In some embodiments Vset can be, for example, 5V and V0 can rise and drop in a plus-minus 0.2V range from 4.8V to 5.2V. Also, at t0 (t2) U1_Out, the output of Error Amplifier U1 is essentially at its maximum level.

At t0 (t2) the short pulse, generated by Mono-vibrator U8, resets Ramp Generator U4. Correspondingly, V_ramp, the output of Ramp Generator U4 drops to essentially zero and starts to rise again. At this stage the voltage of the inverting input of Reset Comparator U2 is below the voltage of its non-inverting input. Therefore, U2_Out, the output voltage of comparator is "Low".

In the first interval of the cycle between t0 and t1 (and also between t2 and t3) MOSFET QPR is ON. Therefore, energy transfers from primary circuit 102 to secondary circuit 104. The induced current in secondary circuit 104 charges capacitor Co and increases output voltage Vo. Since Vo is coupled into the inverting input of Error Amplifier U1, U1_Out, the output voltage of Error Amplifier U1 decreases. At the same time V_ramp, the output voltage of Ramp Generator U4 increases. V_ramp of Ramp Generator U4 exceeds voltage U1_out at about time instance t1. This forces Reset comparator U2 to turn from "Low" to "High". Correspondingly, Monovibrator U12 generates a short pulse, which resets RS trigger U5 to "Low", as shown in the last panel of FIG. 7.

At about time instance t1 (and again at t3), RS Trigger U5 having turned to "Low", MOSFET QPR receives a control signal to turn OFF. This control signal is transmitted through Pulse Transformer T2 and Gate Driver U10. The turning OFF of MOSFET QPR is delayed by the leakage inductance of Pulse Transformer T2. Once MOSFET QPR is turned OFF, the transfer of energy from primary circuit 102 to secondary circuit 104 essentially ends.

In secondary circuit 104 the following processes take place at about time instance t1 (and t3). In the t0-t1 interval MOSFET QFR was ON and MOSFET QFW was OFF. Tracking Turn ON/OFF circuit U11 receives a control signal from RS Trigger U5 to switch MOSFETs QFR ad QFW. With some delay, Tracking Turn ON/OFF circuit U11 relays a corresponding control signal to Adaptive Gate Driver U9 to turn MOSFET QFR OFF and turn MOSFET QFW ON.

FIGS. 11–13 illustrate the corresponding timing diagrams for gate voltages G_QFW and G_QFR. In response to the control signal from Turn ON/OFF Delay circuit U11, Adaptive Gate Driver U9 starts to turn OFF MOSFET QFR by sharply reducing the corresponding gate voltage G_QFR. Simultaneously, Adaptive Gate Driver U9 monitors gate voltage G_QFR and waits until gate voltage G_QFR drops to a predetermined threshold level: this time instance is denoted the threshold-point of G_QFR. Once gate voltage G_QFR drops to the threshold level, Adaptive Gate Driver U9 starts to turn on MOSFET QFW by increasing its gate voltage G_QFW. The instance when G_QFW rises to a predetermined threshold level, or threshold fraction, is denoted as the threshold-point of G_QFW. In some embodiments, the falling threshold point of G_QFR is synchronized to essentially coincide with the rising threshold-point of G_QFW. With this timing sequence, the commutation of MOSFETs QFW and QFR is made efficient, minimizing the losses during switching.

FIGS. 11–13 illustrate an additional aspect of the timing. Tracking Turn ON/OFF circuit U11 monitors gate voltages G_QFW and G_QFR and V_A, the voltage of terminal A. As shown in FIG. 11, the "Turn OFF" delay is large at the beginning of the operation of converter 100. Denoting the falling edge of terminal voltage V_A as terminal falling edge of V_A, the synchronized threshold-points of gate voltages G_QFR and G_QFW occur after the terminal falling edge of V_A. Or, equivalently, the terminal falling edge of V_A is ahead of the shared threshold-point of gate voltages G_QFR and G_QFW. With such a timing converter 100 does not work efficiently, because the load current and the reflected magnetizing current flow through the parasitic diodes of MOSFET QFW.

FIG. 12 illustrates that after the start of the operation of converter 100 the "Turn OFF" delay can be reduced cycle by cycle until V_A starts to fall essentially in the instance, when gate voltages G_QFW and G_QFR are essentially equal. In some embodiments the terminal falling edge of V_A is essentially synchronized with the shared threshold-points of G_QFW and G_QFR. The described timing improves the efficiency of the operation of converter 100, because the parasitic diodes of MOSFETs QFW and QPR are reverse biased during the switching interval and thus do not conduct. Therefore, essentially no energy is lost through parasitic conduction.

FIG. 13 illustrates that under some circumstances the shared threshold-point of gate voltages G_QFW and G_QFR may precede the terminal falling edge of V_A, leading to a decrease of the efficiency of converter 100. A function of Tracking Turn ON/OFF circuit U11 is to track the position of the terminal falling edge of V_A and control it back to essentially coincide with the shared threshold-points of gate voltages G_QFW and G_QFR, maximizing converter efficiency.

Figure 14:
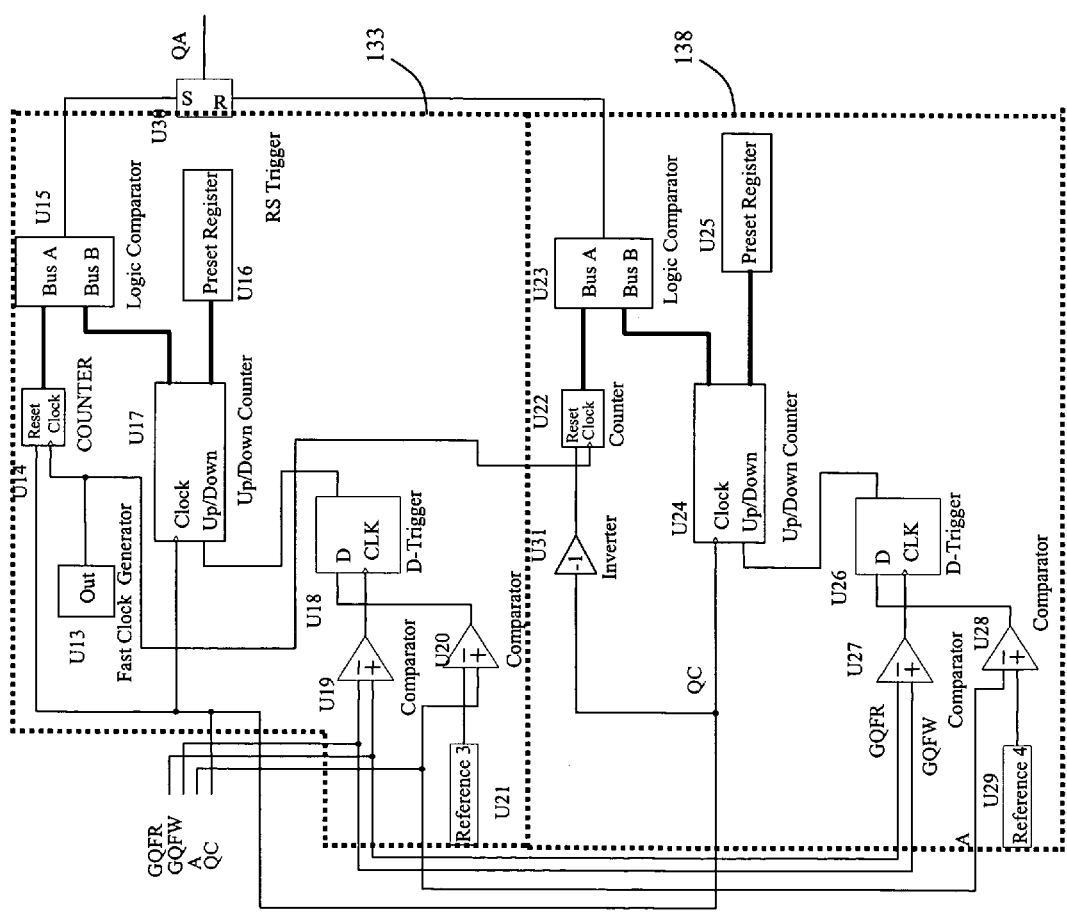
FIG. 14 illustrates an embodiment of Turn ON/OFF circuit according to embodiments of the invention.

FIG. 14 illustrates an embodiment of Tracking ON/OFF circuit U11. The two main components of Tracking ON/OFF circuit U11 are Turn ON circuit 133 and Turn OFF circuit 138, both coupled to RS Trigger U30.

Embodiments of Turn ON circuit 133 include the following components: Fast Clock Generator U13, Counter U14 with Reset Clock, Logic Comparator U15, Preset register U16, Up/Down Counter U17, D-Trigger U18, Comparators U19 and U20, and Reference Voltage Source U21. The connections of these circuit elements of Turn ON 133 circuit are illustrated in FIG. 14.

The operation of the illustrated embodiment of Tracking ON/OFF circuit U11 is as follows. At t0, the beginning of the cycle, the incoming pulse QC from RS Trigger U5, changes from "Low" to "High". This sets Counter U14, thus enabling it to increase its output at each pulse produced by Fast Clock Generator U13. At to Up/Down Counter U17 is preset to a minimum value by Preset Register U16. In the beginning of operations pulse QC increases the output of Up/Down Counter U17. The output of Up/Down Counter U17 is compared with the output of Counter U14 by Logic Comparator U15. At t0 the output of Up/Down Counter U17 is greater than the output of Counter U14. However, as the cycle progresses Fast Clock Generator U13 increases the output of Counter U14. When the output of Counter U14 reaches level of the output of Up/Down Counter U17, Logic Comparator U15 turns from "Low" to "High" and set RS Trigger U30 to "High".

Once RS trigger U30 is "High", Adaptive Gate Drive U9 starts to turn OFF MOSFET QFW and turn ON MOSFET QFR. As a result, gate voltage G_QFW decreases and gate voltage G_QFR increases. When G_QFW becomes equal to G_QFR, the output of Comparator U19 turns from "Low" to "High". D-trigger U18 latches the output of Comparator U20, which compares V_A with the voltage of Reference Voltage Source U21. At the beginning of the operation of converter 100 V_A is lower than the voltage level of Reference Voltage Source U21, see FIG. 8. Therefore, the output of Comparator U20 is "Low" at this time and D trigger U18 latches "Low". Thus Up/Down Counter U17 counts "UP" and increases its output in each cycle. The increasing output of Up/Down Counter U17 leads to an increasing delay of turning ON MOSFET QFR. The time-gap, or misalignment between the moment of turning ON (or threshold-point of) MOSFET QFR and the terminal rising edge of V_A starts to decrease.

Eventually, the delay of turning ON MOSFET QFR becomes significant enough and output of Comparator U20 will be "High", when Comparator U19 turns from "Low" to "High". At this time V_A is higher than the voltage of Reference Voltage Source U21. D-trigger U18 latches "High" and Up/Down Counter U17 starts counting "Down", decreasing its output voltage each cycle. The decreasing output of Up/Down Counter U17 leads to the decrease of the delay of turning ON MOSFET QFR, see FIG. 10.

The described mode of operation enables Tracking ON/OFF circuit U11 to track the terminal rising edge of V_A and synchronize it to the shared threshold-points of gate voltages G_QFR and G_QFW, see FIG. 9.

Turn OFF circuit 138 is a part of Tracking ON/OFF delay U11. Embodiments of Turn OFF circuit 138 include the following components: Counter U22, Logic Comparator U23, Preset register U25, Up/Down Counter U24, D-Trigger U26, Comparators U27 and U28, Reference Voltage Source U29 and Inverter U31.

The operation of the illustrated embodiment of Turn OFF circuit 138 is as follows. Inverter U31 keeps Counter U22 in Reset state as long as the incoming control pulse QC is "High". When incoming pulse QC changes state from "High" to "Low", it enables Counter U22 to increase its output during each pulse produced by Fast Clock Generator U13.

In the beginning of the operation Up/Down Counter U24 is preset to maximum value by Preset Register U25. The arriving QC pulse decreases the output of Up/Down Counter U24. Logic Comparator U23 compares the output of Up/Down Counter U24 with the output of Counter U22. In the beginning of each cycle the output of Up/Down Counter U24 is greater than the output of Counter U22. However, as a cycle progresses, Fast Clock Generator U13 increases the output of Counter U22. When the output of Counter U22 reaches the level of the output of Up/Down Counter U24, Logic Comparator U23 turns from "Low" to "High" and resets RS Trigger U30 to "Low".

Once RS trigger U30 turns to "Low", Adaptive Gate Drive U9 starts to turn OFF MOSFET QFR and turn ON MOSFET QFW. As a result, gate voltage G_QFR decreases and gate voltage G_QFW increases. When G_QFW becomes equal to G_QFR, the output of Comparator U27 turns from "Low" to "High". D-trigger U26 latches the output of Comparator U28, which compares V_A to the voltage of Reference Voltage Source U29. Initially, V_A is lower than the voltage of Reference Voltage Source U29, see FIG. 11. Therefore, the output of Comparator U28 is "High". D-Trigger U26 latches "High" and Up/Down Counter U24 counts "Down" and decreases its output cycle by cycle. The decreasing output of Up/Down Counter U24 leads to a decreasing delay of turning OFF MOSFET QFR. The gap between the moment of turning OFF MOSFET QFR and the terminal falling edge of V_A starts to decrease.

Eventually, the delay of turning OFF MOSFET QFR will be small enough and the output of Comparator U28 will be "Low" every time Comparator U27 turns from "Low" to "High". At this time V_A is lower than the voltage of Reference Voltage Source U29. D-Trigger U26 will latch "Low" and Up/Down Counter U24 will count "UP" and increases its output cycle by cycle. The increasing output of Up/Down Counter U24 leads to an increasing delay of turning OFF MOSFET QFR, see FIG. 13.

Turn OFF circuit 138 tracks the terminal falling edge of V_A and control it to the shared threshold-points of G_QFR and G_QFW, see FIG. 12.

In relation to FIG. 14, a specific embodiment of Tracking ON/OFF circuit U11 has been described. However, many alternative circuits can perform the same functions and are intended to be within the scope of the invention.

Although the present invention and its advantages have been described in detail, it should be understood that various changes, substitutions, and alterations can be made therein without departing from the spirit and scope of the invention as defined by the appended claims. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A controller for a forward converter, the forward converter having a transformer, containing a primary coil in a primary circuit and a secondary coil in a secondary circuit; the controller comprising:
    a primary power device coupled to the primary coil in the primary circuit;
    a resonant reset capacitor coupled in parallel with the primary power device, wherein the resonant capacitor and the primary coil have a primary resonant cycle;
    one or more secondary power device in the secondary circuit; and
    a control logic, coupled to the primary power device and to at least one of the secondary power devices, wherein
        the control logic is capable of turning on the primary power device for a time essentially equal half of the primary resonant cycle;
        the control logic is capable of reversing a polarity of a voltage across the primary coil to keep an average of a magnetizing current in the primary coil essentially zero; and
        the forward converter is operable to transfer energy from the primary coil to the secondary coil when the primary power device is in a conductive state.

2. The controller of claim 1, wherein
    the primary resonant cycle is essentially determined by a capacitance of the resonant reset capacitor and an inductance of the primary coil.

3. The controller of claim 1, wherein the one or more secondary power device comprises:
    a first secondary power device, coupled to a first terminal of the secondary coil and to the control logic; and
    a second secondary power device, coupled to a second terminal of the secondary coil and to the control logic.

4. The controller of claim 3, wherein
    the first secondary power device has a first voltage, having a rising and a falling threshold-point; and
    the secondary power device has a second voltage, having a rising and a falling threshold-point; and
    the control logic is capable of synchronizing at least one of the rising threshold-point of the first voltage with the falling threshold-point of the second voltage, and the falling threshold-point of the first voltage with the rising threshold-point of the second voltage.

5. The controller of claim 4, wherein the synchronizing comprises at least one of:
    adjusting the rising threshold-point of the first voltage to essentially coincide with the falling threshold-point of the second voltage; and
    adjusting the falling threshold-point of the first voltage to essentially coincide with the rising threshold-point of the second voltage.

6. The controller of claim 5, wherein
    the first terminal of the secondary coil has a terminal voltage, having a terminal rising edge and a terminal falling edge; and
    the control logic is capable of synchronizing one of
        the terminal rising edge with the falling threshold-point of the first secondary power device; and
        the terminal falling edge with the rising threshold-point of the first secondary power device.

7. The controller of claim 4, wherein the control logic comprises:
    a tracking turn on/off circuit; and
    an adaptive gate driver, coupled to the tracking turn on/off circuit and to control terminals of the first and second secondary power devices.

8. The controller of claim 7, wherein
    the control terminal of the first secondary power device and the control terminal of the second secondary power device is coupled to the tracking turn on/off circuit.

9. The controller of claim 7, the converter further comprising
    an inductance-capacitor circuit, coupled to the first terminal of the secondary coil, and having an output terminal between the inductance and the capacitor.

10. The controller of claim 9, wherein the control logic further comprises
    a logic circuit, configured to receive signals from the first and second terminals of the secondary coil and the output terminal, wherein the logic circuit is configured to send signals to the tracking turn on/off circuit and to a primary gate driver of the primary power device.

11. The controller of claim 10, wherein the logic circuit comprises:
    an error amplifier, coupled to the output terminal and a first reference voltage source; and
    a set comparator, coupled to the second terminal of the secondary coil and a second reference voltage source.

12. The controller of claim 11, wherein the logic circuit comprises:
    a reset comparator, configured to receive a signal from the error amplifier and from a ramp generator; and
    a set-reset trigger, configured to receive a signal from the reset comparator and from the set comparator, wherein the set-reset trigger is configured to send signals to the tracking turn on/off circuit and to the primary power device through the primary gate driver.

13. The controller of claim 1, wherein the control logic is coupled to the primary power device through a pulse transformer.

14. The controller of claim 1, wherein the first and second power devices are one of MOS-FETs and bipolar junction transistors.

15. A controller for a forward converter, the forward converter having a primary circuit, a secondary circuit, and a transformer, containing a primary coil and a secondary coil; the controller comprising:

a primary power device coupled to the primary coil in the primary circuit; and a control logic, coupled to the primary power device, wherein the control logic is capable of turning on the primary power device with a variable frequency and a duty cycle in excess of 50%; and the forward converter is operable to transfer energy from the primary coil to the secondary coil when the primary power device is in a conductive state.

16. The controller of claim 15, wherein the primary power device has an effective resonant reset capacitor coupled in parallel; and the primary circuit has a primary resonant cycle, essentially determined by a capacitance of the resonant reset capacitor and an inductance of the primary coil.

17. The controller of claim 16, wherein the period of the variable frequency is essentially determined by the primary resonant cycle.

18. A controller for a forward converter, the forward converter having a transformer, containing a primary coil in a primary circuit and a secondary coil in a secondary circuit; the controller comprising:

a first secondary power device, coupled to a first terminal of the secondary coil and having a first voltage with a rising threshold-point and a falling threshold-point; and a second secondary power device, coupled to a second terminal of the secondary coil and having a second voltage with a rising threshold-point and a falling threshold-point; and a control logic, the first and second secondary power devices being coupled to the control logic, wherein the control logic is operable to synchronize one of the rising threshold-point of the first voltage with the falling threshold-point of the second voltage and the falling threshold-point of the first voltage with the rising threshold-point of the second voltage;

the control logic is capable of reversing a polarity of a voltage across the primary coil to keep an average of a magnetizing current in the primary coil essentially zero;

the forward converter is operable to transfer energy from the primary coil to the secondary coil when the primary power device is in a conductive state; and the control logic is operable based on gate voltages of the secondary power devices and not on an output current and an input voltage of the converter.

19. The controller of claim 18, wherein the first terminal of the secondary coil has a terminal voltage, having a terminal rising and a terminal falling edge; and the control logic is capable of synchronizing one of the terminal rising edge with the falling threshold-point of the first secondary power device; and the terminal falling edge with the rising threshold-point of the first secondary power device.

20. The controller of claim 18, having an input voltage, wherein the converter is operable to apply essentially the entire input voltage across the primary coil during a phase of the operation of the converter.

21. The controller of claim 18, wherein the converter is a forward converter.

22. The controller of claim 21, wherein the architecture of the converter is different from a half bridge converter.

23. The controller of claim 18, wherein a polarity of the primary coil and the secondary coil is the same.

24. The controller of claim 18, wherein the primary circuit contains only one switching device and one coil.

25. The controller of claim 18, wherein the converter is operable to transfer energy from the primary circuit to the secondary circuit without charging a capacitor in series with the primary coil.

26. The controller of claim 1, wherein the controller controls the converter corresponding to an essentially un-delayed value of a voltage of the secondary circuit.

* * * * *

UNITED STATES PATENT AND TRADEMARK OFFICE
CERTIFICATE OF CORRECTION

| | | |
|---|---|---|
| PATENT NO. | : 7,113,413 B1 | Page 1 of 1 |
| APPLICATION NO. | : 10/844167 | |
| DATED | : September 26, 2006 | |
| INVENTOR(S) | : Victor Khasiev | |

It is certified that error appears in the above-identified patent and that said Letters Patent is hereby corrected as shown below:

Column 11, claim 1, line 41, "transformer, containing" should read --transformer containing--

Column 11, claim 1, line 49, "device" should read --devices--

Column 11, claim 1, line 54, "equal half" should read --equal to half--

Column 11, claim 1, line 59, "coil essentially" should read --coil at essentially--

Column 12, claim 3, line 2, "device" should read --devices--

Column 12, claim 6, line 29, "one of" should read --one of the following:--

Column 14, claim 19, line 17, "one of" should read --one of the following:--

Signed and Sealed this

Twenty-eighth Day of August, 2007

JON W. DUDAS
*Director of the United States Patent and Trademark Office*